(12) United States Patent
Hsu et al.

(10) Patent No.: US 7,712,187 B2
(45) Date of Patent: May 11, 2010

(54) HINGE ASSEMBLY AND DISPLAY MONITOR WITH THE SAME

(75) Inventors: Sheng-Cheng Hsu, Taipei Hsien (TW); Pu Luo, Shenzhen (CN); Fan-Ming Meng, Shenzhen (CN); Jin-Shu Xue, Shenzhen (CN); Jin-Bu Cai, Shenzhen (CN); Qi-Hua Wei, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

(*) Notice: Subject to any disclaimer, the term of this patent is extended or adjusted under 35 U.S.C. 154(b) by 266 days.

(21) Appl. No.: 11/778,662

(22) Filed: Jul. 17, 2007

(65) Prior Publication Data
US 2008/0141493 A1    Jun. 19, 2008

(30) Foreign Application Priority Data
Dec. 19, 2006   (CN) ..................... 2006 1 0201330

(51) Int. Cl.
   *E05C 17/64*   (2006.01)
(52) U.S. Cl. .......................... 16/337; 16/340
(58) Field of Classification Search ............ 16/337, 16/338, 340, 374; 248/918
See application file for complete search history.

(56) References Cited

U.S. PATENT DOCUMENTS

| | | | | |
|---|---|---|---|---|
| 5,269,047 A * | 12/1993 | Lu | ............................. | 16/340 |
| 6,018,847 A * | 2/2000 | Lu | ............................. | 16/337 |
| 6,666,422 B1 * | 12/2003 | Lu et al. | ................ | 248/291.1 |
| 6,813,813 B2 * | 11/2004 | Lu et al. | ..................... | 16/342 |
| 6,954,221 B2 * | 10/2005 | Wu | ..................... | 361/679.21 |
| 7,082,643 B2 * | 8/2006 | Lu et al. | ..................... | 16/340 |
| 7,114,219 B2 * | 10/2006 | Kiefer et al. | ................ | 16/366 |
| 2004/0250381 A1 * | 12/2004 | Cho et al. | ................... | 16/340 |
| 2007/0169313 A1 * | 7/2007 | Chen et al. | ................... | 16/340 |
| 2007/0234515 A1 * | 10/2007 | Chen | ......................... | 16/337 |
| 2008/0148521 A1 * | 6/2008 | Hill | ............................ | 16/374 |

FOREIGN PATENT DOCUMENTS

| | | |
|---|---|---|
| TW | M252248 | 12/2004 |
| TW | M271196 | 7/2005 |
| TW | M293472 | 7/2006 |

* cited by examiner

*Primary Examiner*—Robert J Sandy
*Assistant Examiner*—Michael Lee
(74) *Attorney, Agent, or Firm*—Frank R. Niranjan

(57) ABSTRACT

A hinge assembly for use in a flat display monitor includes a support member, a rotational base and a pivot mechanism for rotatably connecting the rotational base to the support member. The support member includes two first sidewalls, a first resisting surface and a second resisting surface. Each first sidewall defines a pivoting hole. The pivot mechanism includes a pivotal shaft, a limiting washer and a fixing element. The pivotal shaft includes a shaft portion running through the pivoting bole. The pivotal shaft is non-rotatable relative to the support member. The limiting washer includes a first restricting surface and a second restricting surface. The limiting washer is non-rotatable relative to the rotational base with the first restricting surface and the second restricting surface configured for resisting the first resisting surface and the second resisting surface respectively.

20 Claims, 5 Drawing Sheets

HINGE ASSEMBLY AND DISPLAY MONITOR WITH THE SAME

BACKGROUND OF THE INVENTION

1. Field of the Invention

The present invention generally relates to hinge assemblies, particularly, to a hinge assembly typically used for a flat display monitor. The present invention further provides a display monitor with the hinge assembly.

2. Discussion of the Related Art

With the widespread use of computers, display devices employed by computers come in a variety of sizes, shapes, and weights. In general, a typical display such as a cathode-ray tube (CRT) monitor is bulky, cumbersome, and weighty. These shortcomings are mostly due to the CRT (vacuum tube) shape, size, and components. In addition, the CRT monitors have a significant drawback in that a user easily becomes fatigued when viewing the CRT monitor over several hours because of low image quality of the CRT monitor. Due to this problem alone, many users have switched from CRT monitors to liquid crystal display (LCD) monitors. Such LCDs or flat-panel display monitors offer advantages such as a greatly reduced depth, less weight, and better image quality. Furthermore, flat-panel display monitors may help to overcome shortcomings by folding over (such as with a laptop computer) or rotating (such as with a desktop monitor) so as to facilitate easy adjustment of the position of the flat display monitor relative to the user.

The rotating or folding-over functions of a flat display monitor are realized via a hinge assembly. A typical hinge assembly includes an L-shaped fixed seat, a pivotal axle, and a number of oiled washers. The fixed seat has a retaining hole defined therein. The pivotal axle is pivotally connected with the fixed seat. The pivotal axle has a retaining shoulder formed at a middle portion thereof, a connecting end portion integrally formed at a first end of the retaining shoulder, and a fixing end portion integrally formed at a second end of the retaining shoulder. The connecting end portion of the pivotal axle extends through a retaining hole of the fixed seat along with the oiled washers, and is fastened in the fixed seat by a fastening piece. The hinge assembly limits a maximum inclination angle of the flat display monitor by means of the retaining hole in the fixed seat. However, a high degree of precision is generally required when manufacturing the fixed seat with the retaining hole, and this tends to increase the cost of manufacturing. In addition, edges of the fixed seat around the retaining hole are prone to abrasion. As a result, the flat display monitor may be able to rotate beyond an intended maximum inclination angle, and the flat display monitor may not remain stable at the inclination angle selected by a user. Furthermore, a great effort is required to be able to rotate the hinge assembly.

Therefore, a new hinge assembly is desired in order to overcome the above-described shortcomings.

SUMMARY

In one embodiment, a hinge assembly for use in a flat display monitor includes a support member, a rotational base and a pivot mechanism for rotatably connecting the rotational base to the support member. The support member includes a first resisting surface, a second resisting surface connected with the first resisting surface and a pivoting hole located at a side of the first resisting surface and the second resisting surface. An extending direction of the pivoting hole parallels to the first resisting surface and the second resisting surface.

The pivot mechanism includes a pivotal shaft, a limiting washer and a fixing element. The pivotal shaft has a shaft portion. The shaft portion of the pivotal shaft passes through the pivoting hole so that the pivotal shaft is non-rotatable relative to the support member. The limiting washer has a first restricting surface and a second restricting surface. The limiting washer is non-rotatably relative to the rotational base and the first restricting surface and the second restricting surface are configured for resisting the first resisting surface and the second resisting surface respectively so that the rotational base is rotatable relative to the support member between a first utmost position and a second utmost position. The fixing element is fixed on the pivotal shaft to prevent the limiting washer from disengaging from the pivotal shaft.

Other advantages and novel features will become more apparent from the following detailed description when taken in conjunction with the accompanying drawings.

BRIEF DESCRIPTION OF THE DRAWINGS

The components in the drawings are not necessarily drawn to scale, the emphasis instead being placed upon clearly illustrating the principles of the present hinge assembly and display monitor. Moreover, in the drawings, like reference numerals designate corresponding parts throughout the several views.

DETAILED DESCRIPTION OF THE EMBODIMENTS

Figure 1:
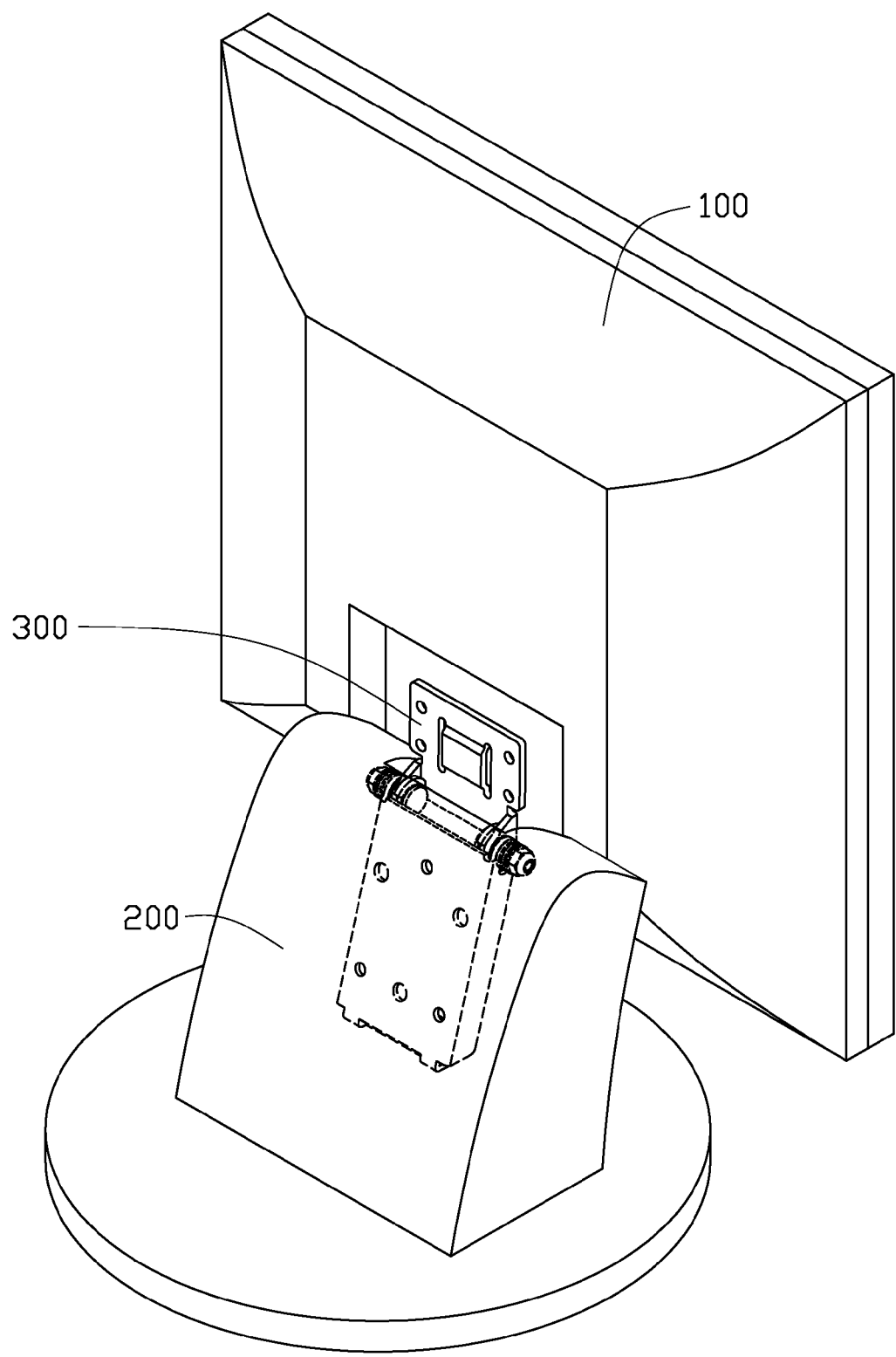
FIG. 1 is an isometric view of a flat display monitor incorporating a hinge assembly (shown in phantom) in accordance with one embodiment of the present invention.

Referring to the drawings in detail, FIG. 1 shows a flat display monitor employing a hinge assembly 300 in accordance with one embodiment of the present invention. The flat display monitor is taken here as an exemplary application for the purposes of describing details of the hinge assembly 300. It is to be understood that the hinge assembly 300 can be advantageously used in numerous other applications, such as cabinet doors, closed-circuit camera installations, etc. Thus, although the hinge assembly 300 provides particular advantages when used in a flat display monitor, the hinge assembly 300 should not be considered to be limited in scope to the field of flat display monitors. The exemplary flat display monitor herein also includes a display body 100 and a support body 200. The hinge assembly 300 connects the display body 100 to the support body 200 such that the display body 100 can be pivoted relative to the support body 200.

Figure 2:
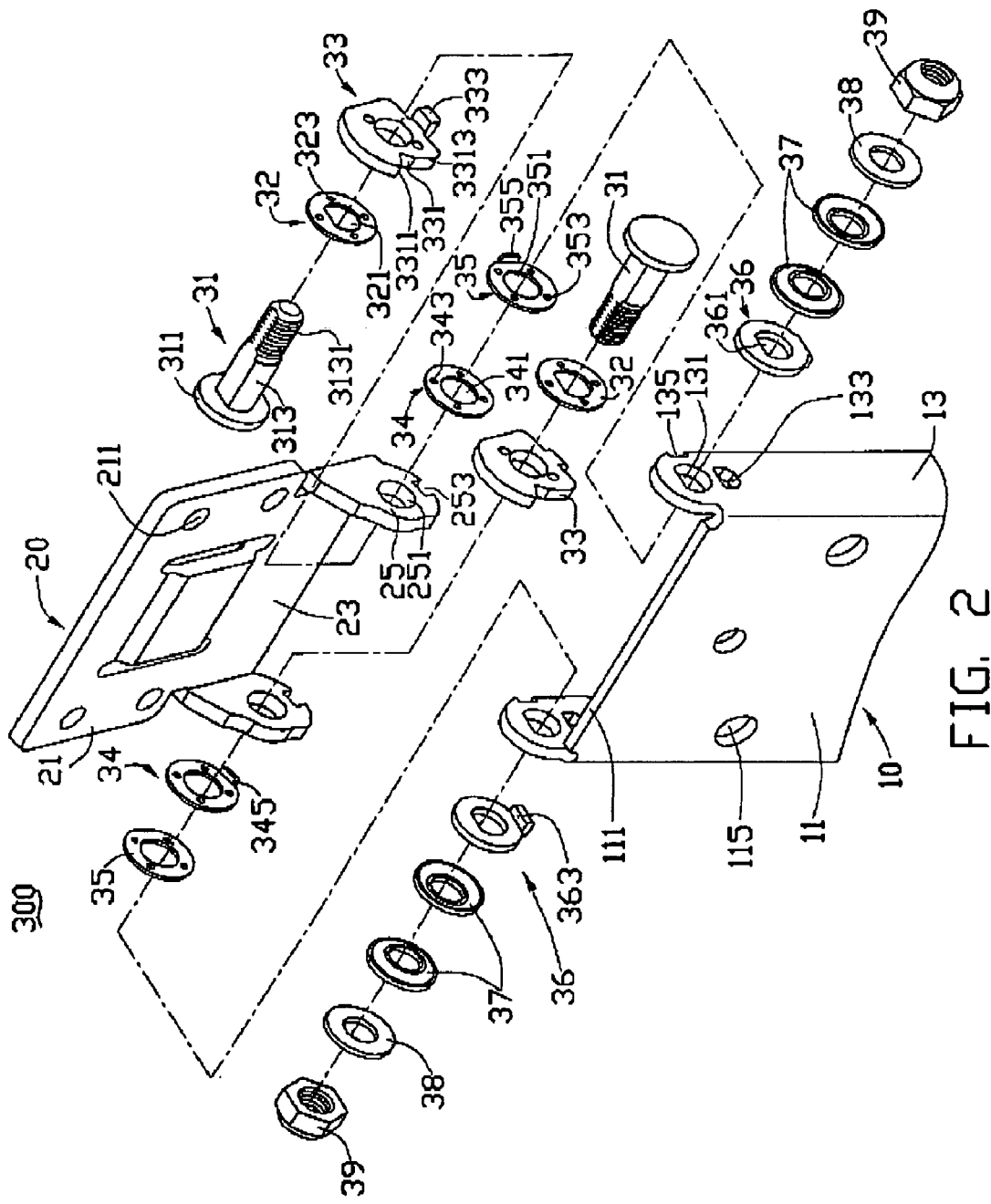
FIG. 2 is an exploded, isometric view of the hinge assembly of FIG. 1.

Referring to FIG. 2, the hinge assembly 300 includes a support member 10, a rotational base 20, and two pivot mechanisms (not labeled). The support member 10 is fixed to the support body 200, and the rotational base 20 is fixed to the display body 100. The pivot mechanisms are used for connecting the support member 10 and the rotational base 20 so that the rotational base 20 and the support member 10 are rotatable relative to each other.

Figure 3:
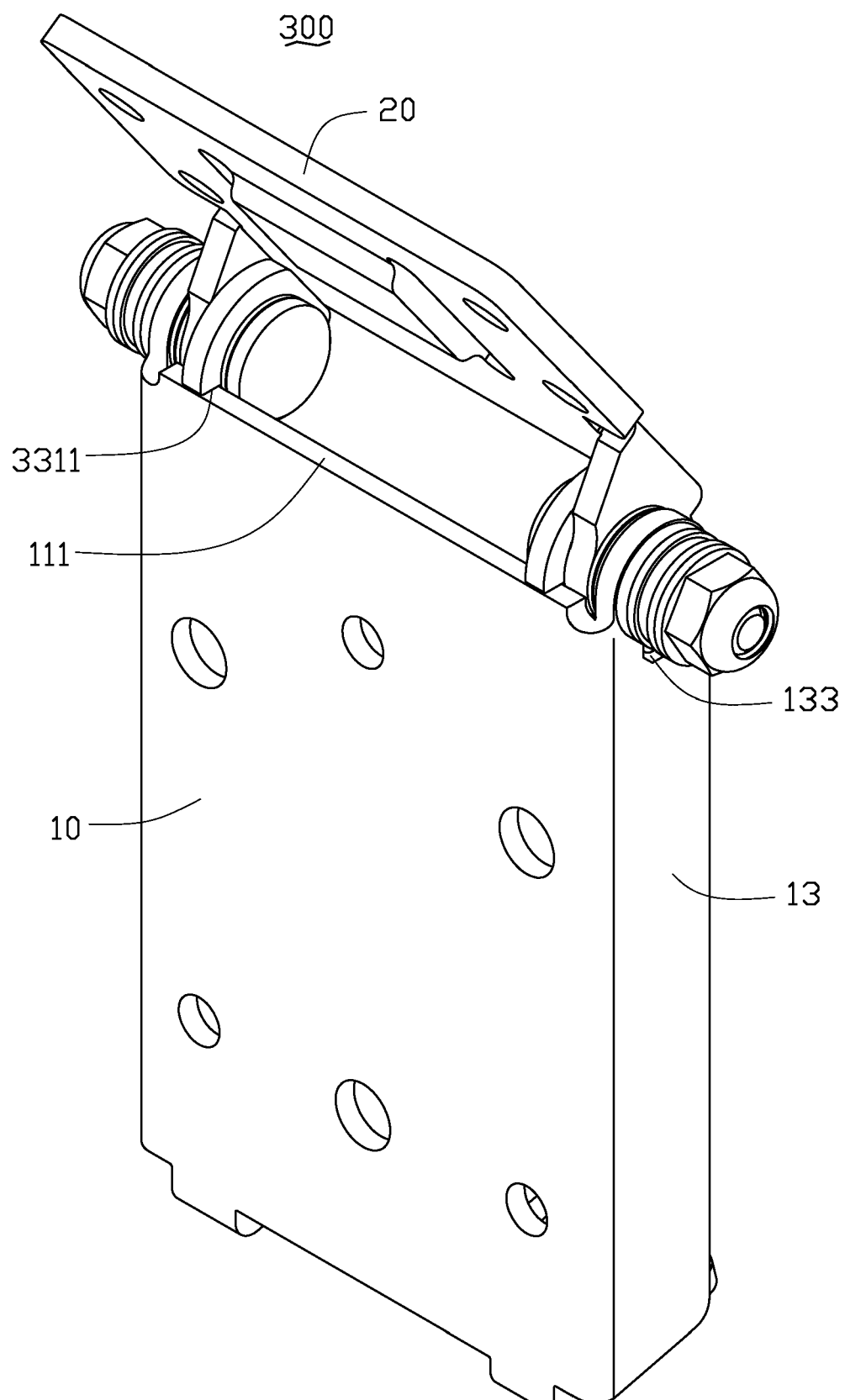
FIG. 3 is an assembled, isometric view of the hinge assembly of FIG. 2, showing a rotational base of the hinge assembly rotated to a first utmost position.
Figure 4:
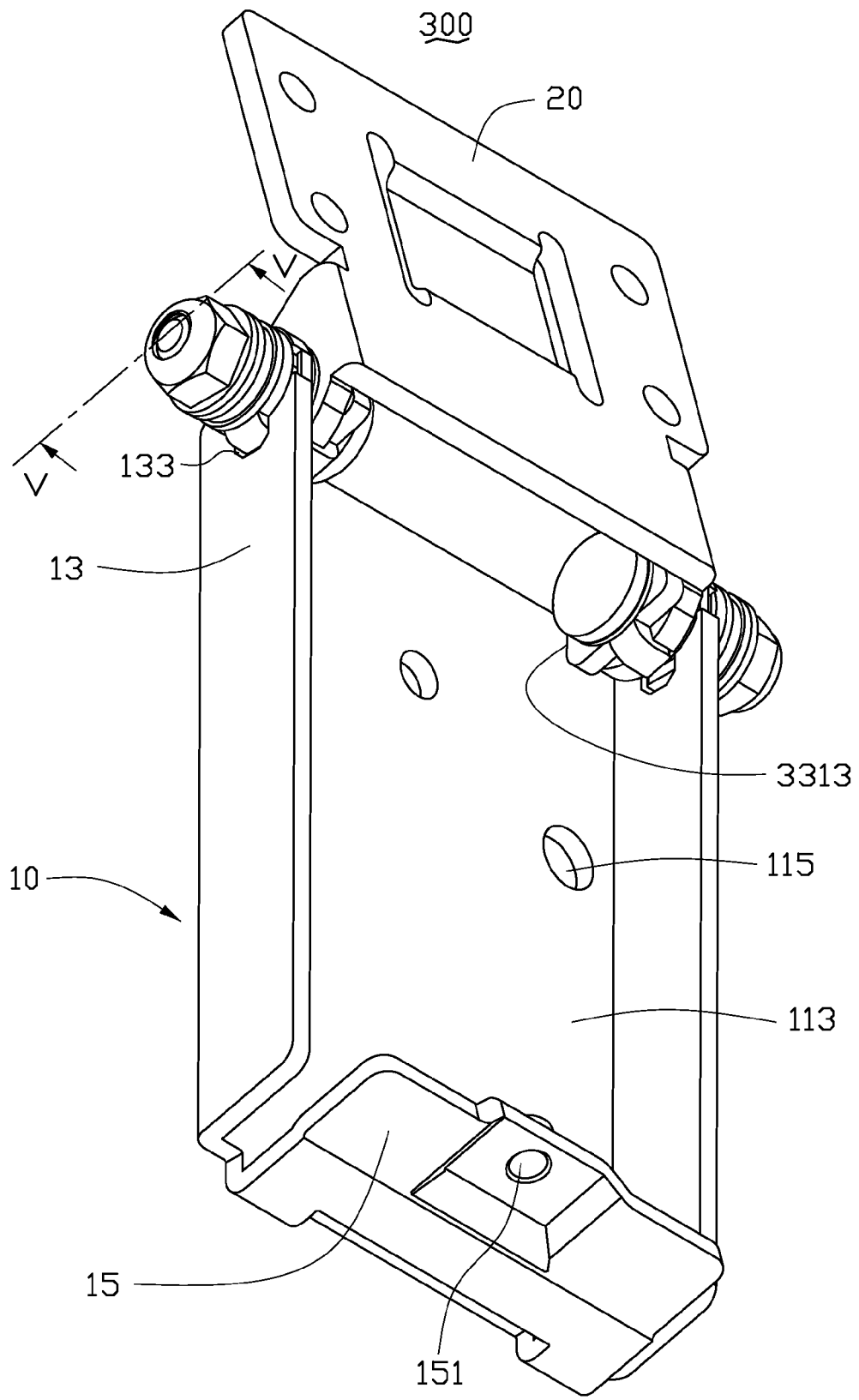
FIG. 4 is similar to FIG. 3, but showing the rotational base of the hinge assembly rotated to a second utmost position.

Also referring to FIGS. 3 and 4, the support member 10 includes a rectangular base 11, two opposite first sidewalls 13 and a second sidewall 15. The base 11 is substantially a flat rectangular. One of the first sidewalls 13 is located at a first edge of the base 11 and another one of the first sidewalls 13 is located at an opposite second edge of the base 11. The second sidewall 15 is located at a third edge of the base 11. The third edge connects the first edge and the second edge of the base 11. The first sidewalls 13 and the second sidewall 15 approximately extend perpendicularly from the corresponding edges of the base 11 toward a same direction from the base 11. A fourth edge of the base 11 has an end surface 111. The base 11 also has an inner surface 113 connected with the end surface 111. A plurality of mounting holes 115 are defined in the base 11. A mounting hole 151 is defined in the second sidewall 15. The mounting holes 115 and the mounting hole 151 are configured to be engaged with the support body 200, fixing the support member 10 on the support body 200. Each first sidewall 13 forms a round corner portion (not labeled) at a first distal end from the second sidewall 15. Each of the round corner portion defines a first pivot hole 131, a securing hole 133 adjacent to the first pivoting hole 131, and a securing groove 135 adjacent to the first pivoting hole 131. The first pivoting hole 131 is located at a side of the inner surface 113 and the end surface 111. A center axis of the first pivoting holes 131 parallels with the inner surface 113 and the end surface 111. The first pivoting hole 131 and the securing hole 133 are both circular deformed holes with a flat edge. In the embodiment, the first pivoting hole 131 is D-shaped. Alternatively, the first pivoting hole 131 may be triangular, square, rectangular etc.

The rotatable base 20 includes a fixing board 21 and two side boards 25 on opposite sides of the rotatable base 20. The fixing board 21 defines a plurality of assembly holes 211. In the illustrated embodiment, there are four assembling holes 211. The rotational base 20 is mounted to the display body 100 by means of the assembling holes 211. The two side boards 25 perpendicularly extend from two opposite edges of the fixing board 21 correspondingly. Each side board 25 forms a second pivoting hole 251 and a restricting groove 253 adjacent to the second pivoting hole 251. The restricting grooves 253 are defined at a periphery of the side boards 25. An axis of the second pivoting hole 251 is perpendicular to the corresponding side board 25. In the illustrated embodiment, the restricting groove 253 is rectangular.

Each pivot mechanism includes a pivotal shaft 31, a first tab washer 32, a limiting washer 33, a second tab washer 34, a third tab washer 35, a protecting piece 36, a pair of resilient rings 37, a washer 38, and a fixing element 39.

The pivotal shaft 31 is substantially cylindrical, and includes a flange 311 and a shaft portion 313 extending from a side of the flange 311. The flange 311 is substantially disk-like in shape. The shaft portion 313 defines a thread 3131 on a distal end portion thereof opposite to the flange 311. The shaft portion 313 is non-circular. In this embodiment, the shaft portion 313 is flattened along a section of a cylindrical surface area thereof, thus forming a flat surface. Thereby, the thread 3131 is discontinuous.

The first tab washer 32 is substantially ringed-shaped, and defines a first deformed hole 321 in a middle. The shape and size of the first deformed hole 321 corresponds a cross-section of the shaft portion 313. In this embodiment, the cross-section of the shaft portion 313 is non-circular. That is, the shaft portion 313 can pass through and be fittingly retained in the first deformed hole 321 of the first tab washer 32. The first tab washer 32 defines a plurality of oil holes 323 adjacent to the first deformed hole 321. The oil holes 323 are configured for storing lubricating oil.

The limiting washer 33 is approximately ring-shaped. The limiting washer 33 defines a V-shaped groove 331 at a periphery thereof. The groove 331 has a first restricting surface 3311 and a second restricting surface 3313. The second restricting surface 3313 is flatter than the first restricting surface 3311. The first restricting surface 3311 is configured for resisting the end surface 111 of the support member 10 and the second restricting surface 3313 is configured for resisting the inner surface 113 of the base 11, thus, a maximal rotatable angle of the rotational base 20 is limited. A tab 333 is formed at a periphery of the limiting washer 33. The tab 333 is configured for engaging with the restricting groove 253 of the rotational base 20 such that the limiting washer 33 is non-rotatable relative to the rotational base 20.

The second tab washer 34 is approximately ring-shaped, and defines a round hole 341 in a middle. The second tab washer 34 defines a plurality of oil holes 343 adjacent to the round hole 341. The oil holes 343 are configured for storing lubricating oil. A tab 345 is formed at a periphery of the second tab washer 34. The tab 345 is configured for engaging with the restricting groove 253 of the rotational base 20 such that the second tab washer 34 is non-rotatable relative to the rotational base 20.

The third tab washer 35 is approximately ring-shaped, and defines a round hole 351 in a middle portion thereof. The third tab washer 35 defines a plurality of oil holes 353 adjacent to the round hole 351. The oil holes 353 are configured for storing lubricating oil. A tab 355 is formed at a periphery of the third tab washer 35. The tab 355 is configured for engaging with the securing groove 135 of the support member 10 such that the third tab washer 35 is non-rotatable relative to the support member 10.

The protecting piece 36 is approximately ring-shaped, and defines a second deformed hole 361 in a middle. The shape and size of the second deformed hole 361 corresponds a cross-section of the shaft portion 313. A tab 363 is formed at a periphery of the protecting piece 36. The tab 363 is configured for engaging with the securing hole 133 of the support member 10 so that the protecting piece 36 is non-rotatable relative to the support member 10.

The resilient rings 37 are generally plate-shaped, and are placed around the shaft portion 313 of the shaft 31. A middle portion of each resilient 37 protrudes toward one side thereof. The resilient rings 37 are configured to provide axial force (see below).

The washer 38 is approximately ring-shaped, and located around the shaft portion 313 of the shaft 31.

The fixing element 39 is a hexagonal nut. The fixing element 39 is configured for engaging with the thread 3131 of the shaft 31 so that the first tab washer 32, the limiting washer 33, the second tab washer 34, the third tab washer 35, the protecting piece 36, resilient rings 37, and the washer 38 are prevented from disengaging from the shaft 31.

Figure 5:
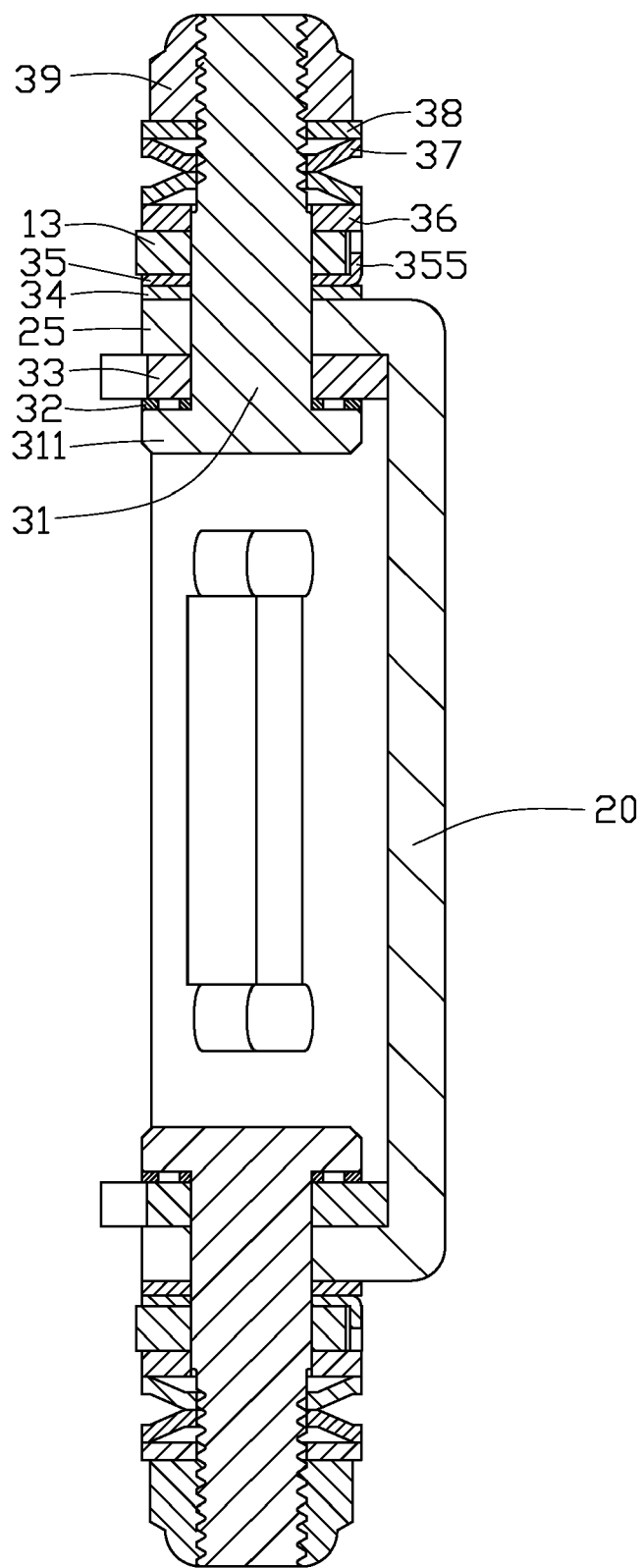
FIG. 5 is a cross-sectional view taken along line V-V of FIG. 3.

Referring to FIGS. 3-5, in assembling process, the first pivoting holes 131 of the first sidewalls 13 of the support member 10 are aligned with the second pivoting holes 251 of the side boards 25 of the rotational base 20, with the two side boards 25 of the rotational base 20 disposed between the two first sidewalls 13 of the support member 10. Then a procedure of assembling one of the pivot mechanisms into the support member 10 and the rotational base 20 starts. The shaft portion 313 of the pivotal shaft 31 passes through the first tab washer 32, the limiting washer 33, the second pivoting hole 251 of a corresponding side board 25, the second tab washer 34, the third tab washer 35, the first pivoting hole 131 of a corresponding first sidewall 13, the protecting piece 36, the resilient rings 37, and the washer 38 in that order. The shaft portion 313 of the pivotal shaft 31 engages in the first pivoting hole 131 of support member 10 so that the pivotal shaft 31 is non-rotatable relative to the support member 10. The first tab washer 32 is placed around the shaft portion 313 of the pivotal shaft 31 and resists the non-circular cross sectioned shaft portion 313 of the pivotal shaft 31 so that the first tab washer 32 is non-rotatable relative to the pivotal shaft 31. The tab 333 of the limiting washer 33 and the tab 345 of the second tab washer 34 are received in the restricting groove 253 of the rotational base 20 so that the limiting washer 33 and the second tab washer 34 are non-rotatable relative to the rotational base 20. The tab 355 of the third tab washer 35 is received in the securing groove 135 of the support member 10 so that the third tab washer 35 is non-rotatable relative to the support member 10. The separating piece 36 is placed around the shaft portion 313 of the pivotal shaft 31 and the tab 363 is received in the securing hole 133 of the support member 10 so that the separating piece 36 is non-rotatable relative to the pivotal shaft 31 and the support member 10. The two resilient rings 37 abut each other and are oriented symmetrically opposite to each other. The fixing element 39 is secured at the pivotal shaft 31. Thus the first tab washer 32, the limiting washer 33. the second pivoting hole 251 of the side board 25, the second tab washer 34, the third tab washer 35, the first pivoting hole 131 of the first sidewall 13, the protecting piece 36, the resilient rings 37, and the washer 38 are located between the flange 311 of the shaft 31 and the fixing element 39 in that order. Hence, one of the pivot mechanisms is assembled into the support member 10 and the rotational base 20. In this pivot mechanism, the first tab washer 32, the limiting washer 33, one of the side boards 25, the second tab washer 34, the third tab washer 35, one of the first sidewalls 13, the protecting piece 36, the resilient rings 37, and the washer 38 abut each other. The limiting washer 33 and the second tab washer 34 are non-rotatable relative to the rotational base 20. The third tab washer 35 and the protecting piece 36 are non-rotatable relative to the support member 10. Similarly, the other pivot mechanism is assembled into the support member 10 and the rotational base 20.

The hinge assembly 300 is used to assemble the flat display monitor. The support member 10 is fixed to the support body 200 by means of engaging fasteners in the mounting holes 115 and 151. The fasteners can for example be bolts or screws. The rotational base 20 is fixed to display body 100 by means of engaging fasteners via the threaded assembling holes 211. The fasteners can for example be bolts or screws.

In each pivot mechanism of the hinge assembly 300, the first restricting surface 3311 of each groove 331 is configured for resisting the end surface 111 of the support member 10 and the second restricting surface 3313 is configured for resisting the inner surface 113 of the support member 10, therefore a maximal rotatable angle of the rotational base 20 is limited. Thus a maximal rotatable angle of the display body 100 is limited. In addition, because of the axial force of resilient rings, the tab washers 32, 34, 35, the limiting washers 33, the protecting piece 36, the two resilient rings 37, and the washer 38 together cooperatively help provide an amount of friction that allows movement of the display body 100 relative to the support body 200 when applied a moderate force, and that also allows the display body 100 to be stably maintained in a desired position relative to the support body 200.

In use, a force is exerted on the display body 100. Since the support member 10 is fixed relative to the support body 200, the display body 100 drives the rotational base 20 to rotate at a direction of the force. In each pivot mechanism, the limiting washer 33 and the second tab washer 34 also rotate together with the rotational base 20 because the tab 333 of the limiting washer 33 and the tab 345 of the second tab washer 34 are received in the restricting groove 253. The support member 10 remains relatively stationary to the support body 200. Referring to FIG. 3, when the display body 100 rotates through a determined angle in the first direction to a first utmost position, the end surface 111 resists the first restricting surface 3311 of the limiting washer 33. Thereby, the display body 100 together with the rotational base 20 cannot rotate further in the first direction. Referring to FIG. 4, when the display body 100 rotates through a determined angle in the second direction to a second utmost position, the inner surface of 113 resists the second restricting surface 3313 of the limiting washer 33. Hence, the display body 100 together with the rotational base 20 cannot rotate further in the second direction. The hinge assembly 300 restricts a maximum inclination angle of the flat display monitor in each of the first and second directions, by provision of the first restricting surface 3311 and the second restricting surface 3313 of the limiting washer 33. In addition, the first tab washer 32 and the limiting washer 33 abut each other, the second tab washer 34 and the third tab washer 35 abut each other, thus the limiting washer 33 and the second tab washer 34 has a frictional force. Thereby, the rotational base 20 can remain stationary at a position relative to the support member 10. In other words, the display body 100 can be adjusted to a desired position.

It can be understood that the pivotal shaft 31 can be fastened in position by means of one or more other holding members such as a rivet or a ring. For example, the fixing element 39 can be replaced by a C-shaped ring and the thread 3131 of the shaft portion 313 can be replaced by a C-shaped receiving groove correspondingly. Only a single pivot mechanism may be provided. In such case, the above-described configurations of the first sidewall 13 of the support member 10, the side board 25 of the rotational base 20 and the shaft 31 need only one of each of these components. Other elastic members such as springs or elastic washers may replace the two resilient rings 37. The support member 10 may be mounted to the display body 100, in which the rotational base 20 is mounted to the support body 200. The end surface 111 of the support member 10 is only configured for resisting the first restricting surface 3311 of the limiting washer 33 and the inner surface 113 of the base 11 is only configured for resisting the second restricting surface 3313 of the limiting washer 33. Therefore the end surface 111 of the support member 10 and the inner surface 113 of support member 10 can be other configuration, such as a first resisting surface and a second resisting surface.

As described above, the hinge assembly 300 makes it convenient for a user to operate a device such as a flat display screen. In addition, it is to be understood that the hinge assembly 300 can be used in other applications in which it may be desirable to allow selective pivoting of an object over a limited angular range. For example, the hinge assembly 300 may be applied in a freestanding, adjustable mirror.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A hinge assembly, comprising:
a support member having a base and two first sidewalls located at opposite edges of the base of the support member, the base having an inner surface and an end surface connected with the inner surface, the end surface located at an edge connecting the opposite edges of the base, and a pivoting hole located at a side of the inner surface and the end surface, an extending direction of the pivoting hole being parallel with the inner surface and the end surface;
a rotational base;
a pivot mechanism for rotatably connecting the rotational base to the support member, the pivot mechanism comprising:
a pivotal shaft with a shaft portion running through the pivoting hole of the support member so that the pivotal shaft being non-rotatable relative to the support member;
a limiting washer with a first restricting surface and a second restricting surface, the limiting washer being non-rotatable relative to the rotational base, the first restricting surface and the second restricting surface configured for resisting the inner surface of the support member and the end surface of the support member respectively so that the rotational base is rotatable relative to the support member between a first utmost position and a second utmost position; and
a fixing element, fixed on the pivotal shaft to prevent the limiting washer from disengaging from the pivotal shaft.

2. The hinge assembly as claimed in claim 1, wherein the support member further comprises a second sidewall located at an edge connecting the opposite edges of the base, the pivoting hole defined in one of the two first sidewalls.

3. The hinge assembly as claimed in claim 1, wherein the shaft portion defines a thread and the fixing element is a hexagonal nut.

4. The hinge assembly as claimed in claim 1, wherein the limiting washer is ring-shaped and defines a V-shaped groove at a periphery thereof, the first restricting surface and the second restricting surface cooperatively define the groove.

5. The hinge assembly as claimed in claim 1, wherein the limiting washer has a tab, the rotational base comprises at least one side board with a restricting groove, the restricting groove is configured for receiving the tab so that the limiting washer is non-rotatable relative to the rotational base.

6. The hinge assembly as claimed in claim 1, wherein the pivot mechanism further comprises a protecting piece located between the support member and the fixing element, the protecting piece is ring-shaped and defines a deformed hole in a middle portion thereof, a shape and size of the deformed hole corresponds a cross-section of the shaft portion, the protecting piece is placed around the shaft portion of the pivotal shaft and non-rotatable relative to the pivotal shaft.

7. The hinge assembly as claimed in claim 6, wherein the protecting piece forms a tab at a periphery thereof, the first sidewall of the support member defines a securing hole adjacent to the pivoting hole, the securing hole is configured for engaging with the tab of the protecting piece.

8. The hinge assembly as claimed in claim 1, wherein the pivot mechanism includes two elastic members located between the limiting washer and the fixing element, the two elastic members abut each other and each elastic member is plate-shaped and placed around the shaft portion of the pivotal shaft.

9. The hinge assembly as claimed in claim 1, wherein the pivot mechanism includes a tab washer with a tab fanning at a periphery of the tab washer, the tab washer is ring-shaped and defines a round hole in a middle portion thereof and a plurality of oil holes adjacent to the round hole, the rotational base having a restricting groove for receiving the tab of the tab washer such that the tab washer is non-rotatable relative to the rotational base.

10. The hinge assembly as claimed in claim 1, wherein the pivot mechanism includes a tab washer with a tab forming at a periphery of the tab washer, the tab washer is ring-shaped and defines a round hole in a middle portion thereof and a plurality of oil holes adjacent to the round hole, the support member having securing groove adjacent to the pivoting hole for receiving the tab of the tab washer such that the tab washer is non-rotatable relative to the support member.

11. A hinge assembly comprising:
a first member having a base and two first sidewalls located at opposite edges of the base of the first member respectively, the base having an inner surface and an end surface connected with the inner surface, the end surface located at an edge connecting the opposite edges of the base;
a second member pivotably connected to the first member;
a limiting member having a restricting portion for engaging with the inner surface and the end surface of the base so as to restrict the second member rotating between a first utmost position and a second utmost position relative to the first member; and
a shaft running through the first member, the second member and the limiting member for fastening the members together.

12. The hinge assembly as claimed in claim 11, wherein the restricting portion has two restricting surfaces, each restricting surface is configured for restricting a corresponding resisting surface.

13. A display monitor comprising:
a display body;
a support body; and
a hinge assembly including a support member fixed to the support body, a rotational base fixed to the display body, and a pivot mechanism rotatably connecting the rotational base and the support member, the support member having a base and two first sidewalls located at opposite edges of the base of the support member respectively, the base having an inner surface and an end surface connected with the inner surface, the end surface located at an edge connecting the opposite edges of the base, and a pivoting hole located at a side of the inner surface and the end surface, an extending direction of the pivoting hole being parallel with the inner surface and the end surface;
the pivot mechanism including:
a pivotal shaft with a shaft portion, said shaft portion of the pivotal shaft running through the pivoting hole of the support member so that the pivotal shaft being non-rotatable relative to the support member;
a limiting washer with a first restricting surface and a second restricting surface, the limiting washer being non-rotatable relative to the rotational base; and
a fixing element, fixed on the pivotal shaft to prevent the limiting washer from disengaging from the pivotal shaft, the first restricting surface and the second restricting surface configured for resisting the inner surface and the end surface respectively so that the rotational base is rotatable relative to the support member between a first utmost position and a second utmost position, and the rotational base together with the display body has a limited range of rotation between a first utmost position and a second utmost position.

14. The display monitor as claimed in claim 13, wherein the support member further comprises a second sidewall, located at an edge connecting the two opposite edge of the base, the pivoting hole defined in one of the two first sidewalls.

15. The display monitor as claimed in claim 13, wherein the shaft portion defines a thread and the fixing element is a hexagonal nut.

16. The display monitor as claimed in claim 13, wherein the limiting washer is ring-shaped and defines a V-shaped groove at a periphery thereof, the first restricting surface and the second restricting surface cooperatively define the groove.

17. The display monitor as claimed in claim 13, wherein the limiting washer has a tab, the rotational base comprises at least one side board with a restricting groove, the restricting groove is configured for receiving the tab so that the limiting washer is non-rotatable relative to the rotational base.

18. The display monitor as claimed in claim 13, wherein the pivot mechanism further comprises a protecting piece located between the support member and the fixing element the protecting piece is ring-shaped and defines a deformed hole in a middle portion thereof, a shape and size of the deformed hole corresponds to a cross-section of the shaft portion, the protecting piece is placed around the shaft portion of the pivotal shaft and non-rotatable relative to the pivotal shaft.

19. The display monitor as claimed in claim 18, wherein the protecting piece forms a tab at a periphery thereof, the first sidewall of the support member defines a securing hole adjacent to the pivoting bole, the securing hole is configured for engaging with the tab of the protecting piece.

20. The display monitor as claimed in claim 13, wherein the pivot mechanism includes two elastic members located between the limiting washer and the fixing element, the two elastic members abut each other and each elastic member is plate-shaped and placed around the shaft portion of the pivotal shaft.

* * * * *